(No Model.)

J. S. ROAKE.
WATER HEATER AND FILTER.

No. 396,234. Patented Jan. 15, 1889.

Witnesses:
Charles R. Searle,
H. A. Johnstone.

Inventor:
John S. Roake
by his attorney
Thomas Drew Stetson

N. PETERS, Photo-Lithographer, Washington, D. C.

UNITED STATES PATENT OFFICE.

JOHN S. ROAKE, OF BROOKLYN, NEW YORK.

WATER HEATER AND FILTER.

SPECIFICATION forming part of Letters Patent No. 396,234, dated January 15, 1889.

Application filed April 16, 1888. Serial No. 270,716. (No model.)

*To all whom it may concern:*

Be it known that I, JOHN S. ROAKE, of Brooklyn, in the county of Kings and State of New York, doing business in the city and county of New York, have invented a certain new and Improved Water Heater and Filter, of which the following is a specification.

My apparatus is intended more especially for treating feed-water for steam-boilers, and will be described as thus used; but it will be understood that it may be of service in treating water or other fluids for other purposes wherever a liberal supply of steam can be made available and it is desirable or allowable to deliver the filtered water at a high temperature.

The apparatus is capable of being used as a heater alone, receiving and delivering a large quantity of water and raising its temperature, or as a filter alone, delivering the filtered water in smaller quantities at a high temperature; or it may be used for both purposes simultaneously—that is to say, delivering a large quantity of water through one passage and delivering a small quantity through another passage, both raised in temperature, and the latter quantity filtered, so as to remove all the foreign matter which is insoluble or which becomes so when its temperature is raised.

The only impurities that we need pay any especial attention to in waters used for steam-boilers are the carbonates of lime and magnesia and the sulphate of lime. I propose in this heater to keep the feed-water at a temperature of 212°, and above that when practicable. The lime and magnesia at these temperatures will be precipitated. I then apply a chemical that will free the sulphuric acid and throw out the lime in the form of a phosphate, which is caught and held by the filtering-matter, and the water after it has passed through the filter may be considered as being chemically pure from scale-producing salts.

The accompanying drawings form a part of this specification and represent what I consider the best means of carrying out the invention.

Figure 1:
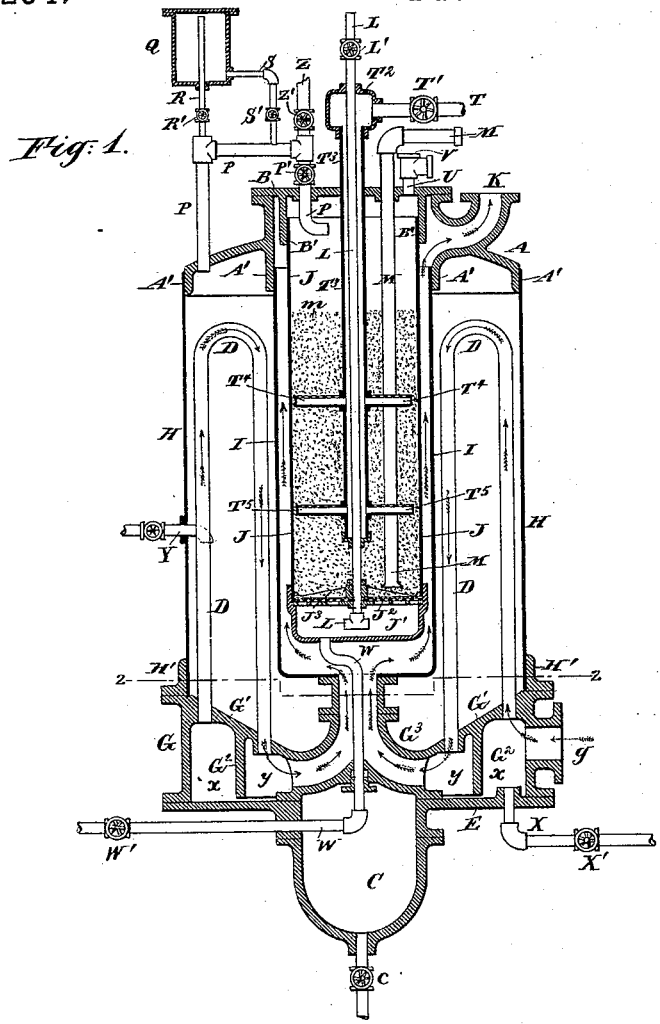
Figure 2:
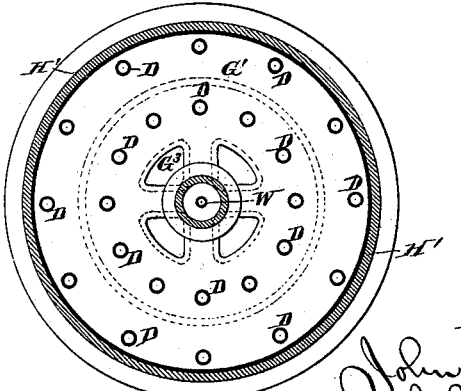

Figure 1 is a central vertical section, and Fig. 2 is a horizontal section on the line $z\ z$ in Fig. 1.

Similar letters of reference indicate corresponding parts in both the figures where they occur.

C is a cup-shaped vessel at the bottom, which receives the sediment deposited in the heater and allows it to be blown off at intervals through a pipe controlled by a stop-cock, $c$. The base of the main portion above is a horizontal plate, E. Upon this is a casting, G, which performs important functions. Certain portions of this casting will be designated when necessary by additional marks, as $G'$ $G^2$, &c. The periphery is a short vertical cylinder provided with a capacious nozzle, $g$, adapted to receive the steam from the exhaust-pipe of a steam-engine or other supply. The main portion of the upper face, $G'$, is inclined inward, forming an inverted cone. A cylindrical partition, $G^2$, extends from the under face of this nearly but not quite to the plate E. The middle of the casting forms a hollow cross, $G^3$, which allows the steam after it has traversed the U-shaped pipes D to flow inward and upward in the center of the apparatus. The casting G is equipped with flanges secured by bolts to the plate E below and to a flange, $H'$, riveted or otherwise secured on the base of a cylindrical casing, H, which extends upward something higher than the U-shaped pipes D. The steam flowing inward and upward at the bottom is received in a cylindrical casing, I, which extends downward from the top, and is of sufficient diameter to inclose a smaller filtering-cylinder, J, with space between for the steam to rise freely.

The top is formed by a slightly-domed casting, A, riveted to the upper edges of H and riveted by internal flanges, $A'$, to the upper edge of the casing I. The center of the top is raised, and is covered by a plate, B, having a cylindrical lip, $B'$, to which is riveted the upper edge of the cylindrical shell J, which incloses the filtering material, $m$, and constitutes the filter. The steam rising in the space between I and J is discharged through a side nozzle, K, where it finally escapes, and may be led away by a suitable pipe. (Not shown.) The bottom of the filtering-case J is formed by an inverted dome-shaped casting, $J'$, in which the water collects after its filtration and rises through a central pipe, L, which may communicate with a pipe or system of pipes leading the purified and heated water to a reservoir at any convenient point or direct to the boiler.

I will describe the filtering material, $m$, as a mixture of sand with finely-broken charcoal or coke. It is supported by a perforated plate, $J^2$, covered, if desired, with wire-gauze or other suitable straining material, held down by a spider-casting, $J^3$. The water to be filtered is received from the heater-chamber through a pipe, P, which extends upward horizontally and downward into the filter, the flow being controlled by a cock, $P'$. The end which delivers into the filter is deflected horizontally, to avoid too much disturbance of the loose and easily-movable grains which constitute the filtering material.

Q is a vessel mounted a little above the pipe P. A supply-pipe, R, controlled by a cock, $R'$, brings water under the pressure which obtains in the pipe P into the top of the vessel Q. A pipe, S, controlled by a cock, $S'$, connects the bottom of the vessel Q with the pipe P. The cover of the vessel Q may be removed at intervals and a suitable chemical—I prefer trisodium phosphate—be introduced in the vessel and the cover returned and secured. The cocks $R'$ and $S'$ being opened, the water flows upward through R into the top of Q, and is discharged through S from the bottom with the chemical in solution. I propose under ordinary conditions to set the cocks $R'$ and $S'$ partly open, and allow a small quantity of trisodium phosphate or analogous chemical to flow continuously into the water which is to be filtered.

T is what I term the "wash-pipe," controlled by a cock, $T'$. It is connected with the delivery-orifice of a pump. (Not shown.) It connects by a chamber, $T^2$, with a vertical pipe, $T^3$, which concentrically incloses the delivery-pipe L and extends down into and nearly to the bottom of the mass of filtering material, $m$. This pipe is provided with perforated branches $T^4$ $T^5$.

The principal portion of the foreign matter in the water being treated is stopped near the top of the filtering material, $m$.

When the filter has been running for a sufficient time to have accumulated some foreign matter and it is desired to wash it, I stop the ordinary operation of the filter by closing the cock $P'$, which admits the water, and the cock $L'$, which discharges it, open the cock $T'$, which controls the pipe T, and set the pump (not shown) in gentle operation. The water therefrom flows downward through the wash-pipe T and escapes through the orifices in the uppermost branch pipes, $T^4$. It lifts and loosens the filtering material in the upper portion of the filter and carries away all the dirt which is loose and can be removed by such means, allowing it to escape through the pipe U and be led to the sewer or other receptacle for dirty water. After the current has worked in this manner for a little time to cleanse the upper portion of the filtering material, the pump is worked faster, and so strong a stream is forced down through the pipe T that it cannot all escape through the orifices in the upper branch pipes, $T^4$, and a portion is compelled to descend farther and escape through the perforations in the lower branch pipes, $T^5$. The water therefrom rises through the deeper mass of filtering material above it and removes the foreign matter which may have descended so far into the mass of filtering material. When at long intervals it may be required to also wash the extreme lowest particles of the filtering material $m$, the water may, by suitable connections and cocks, (not shown,) be received through the pipe W, sending a current upward through W and through the entire mass of sand and coke or other loose filtering material, $m$, escaping, as in the other cases, through the pipe U.

M is a pipe presenting an open trumpet-mouth end near the bottom of the sand in the filter. This pipe, in connection with the other parts, serves to remove the filtering material, $m$. This should be done at intervals, depending on the foulness of the water and the time required for the charcoal to lose its power by becoming saturated with the objectionable elements absorbed from the water.

To use this part of the apparatus the filtering material, $m$, should first be loosened up by a strong introduction of water through the wash-pipe T, allowing it to escape freely through the pipe U. Then, the pipe M being suddenly opened by the removal of a screw-cap or by operating other suitable stopping means which had previously kept it closed, and the further escape of the water through the pipe U being stopped by applying a valve or a plug or screw-cap, (not shown,) the water, continuing to come in with a strong flow through the wash-pipe T, escapes, carrying the sand with it through the pipe M. This will continue until nearly all the filtering material, $m$, is removed. To introduce fresh filtering material, $m$, a screw-cap, V, is removed from the angle in the pipe U, and a sufficient quantity of material is introduced through the orifice thus presented.

W is a pipe connecting with the bottom chamber, $J'$, of the filter. It leads downward through a stuffing-box and discharges laterally, controlled by a stop-cock, $W'$. The filter is readily emptied through this pipe when desired.

X is a pipe connected to the annular chamber $x$ and controlled by a cock, $X'$. It allows most of the water in the annular chambers to be discharged. It is arranged to retain a sufficient quantity of water to insure that the steam on being admitted does not flow under the circular partition $G^2$, but is compelled to traverse the pipes D.

The operation of my apparatus either as a heater or filter, or as both, will be understood. The steam entering the outer annular chamber, $x$, flows upward and downward through the bent pipes D, raising the temperature of the water which is inducted through the passage Y, and when used as a heater alone is discharged through a pipe, Z. The steam condensed by the operation gathers in the bottom of the annular chambers $x y$, and is drawn out at intervals or continuously through the pipe X. I propose where the operation is continuous to apply a trap to this pipe X, so that the condensed water shall be discharged automatically. The steam which remains uncondensed flows inward and upward through the cross $G^3$, and, spreading itself in the casing I, flows upward in the annular space around the filter J and out through the nozzle K. When the apparatus is required to additionally filter a portion of the water, the stop-cock P' is opened, and a portion of the water thus heated and filling the liberal space between H and I is allowed to flow through the pipe P and be admitted upon the top of the filtering material, $m$. It flows downward and through the interstices in the closely-packed filtering material, leaving its foreign matter near the top thereof. It descends through the perforated plate $J^2$ at the bottom of the filter, and, entering the open T-shaped end of the pipe L, ascends through this pipe and is led away to any point desired. When it is desired to filter all the water, it is necessary simply to close the cock Z', and then only so much water will go through the apparatus as can move downward through the interstices in the filtering material, $m$, and be discharged upward through the small pipe L.

Modifications may be made without departing from the principle or sacrificing the advantages of the invention. The pipes D may be varied in size, number, and arrangement. Parts of the invention may be made without the whole. The passage of steam through the annular space between the casings I and J may be continued during the washing operation. It may be of advantage to wash the filtering material with water thus heated.

I do not in this application claim the provisions for washing the filter, except in combination with the provisions for both filtering and heating the water. The filter in itself will be made the subject of a separate application for patent.

I claim as my invention—

1. The water heater and filter described, having the chamber I, inclosing the filter J, with a space between for the passage of steam, in combination with provisions for filtering the water in the interior vessel and for supplying and taking away such water continuously, substantially as herein specified.

2. In a water heater and filter, the wash-pipe T, with its perforated branches $T^4 T^5$, in combination with the filter-case J and with the exterior casing, I, and provisions for circulating steam between, adapted to serve at will for filtering the water by a downward current and for cleaning the filter by an upward current through the filtering material, substantially as herein specified.

3. In a water heater and filter, in combination with the filter J and the surrounding casing I, and with provisions for passing steam through the same, the vessel Q, adapted to receive a chemical, and the pipes R S, arranged for introducing the chemical gradually into the water during its transition from the heating-chamber I to the filter, as herein specified.

4. The combined water heater and filter described, having filtering material, $m$, and provisions for passing water through it, inclosed in a casing, J, in combination with a larger casing, I, in which it is inclosed, with provisions for passing steam through the space between, and with a larger casing, H, with provisions for heating the water in the space between I and H previous to its introduction to the filter, as herein specified.

In testimony whereof I have hereunto set my hand, at New York city, this 12th day of April, 1888, in the presence of two subscribing witnesses.

JOHN S. ROAKE.

Witnesses:
H. A. JOHNSTONE,
M. F. BOYLE.